Figure 2:
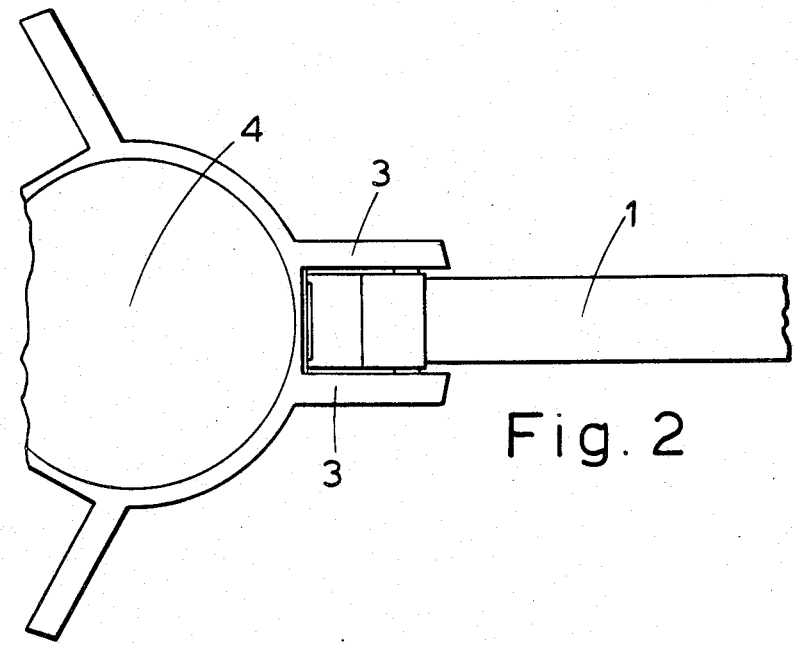

United States Patent [19]

Brown

[11] Patent Number: 4,636,103

[45] Date of Patent: Jan. 13, 1987

[54] LOCKING MECHANISM

[75] Inventor: Leslie F. Brown, Ramsgate, United Kingdom

[73] Assignee: Instro Precision Ltd., Kent, England

[21] Appl. No.: 799,728

[22] Filed: Nov. 19, 1985

[51] Int. Cl.[4] .......................... F16C 11/00; F16D 1/12
[52] U.S. Cl. ..................................... 403/92; 403/103; 248/412
[58] Field of Search .......................... 403/91, 103, 92; 248/412

[56] References Cited

U.S. PATENT DOCUMENTS 3,467,352  9/1969  Bohler .............................. 248/412 X

FOREIGN PATENT DOCUMENTS 1311933  11/1962  France ................................... 403/91
2366509   6/1978  France .................................. 403/103

Primary Examiner—Andrew V. Kundrat

Attorney, Agent, or Firm—Lowe, Price, LeBlanc, Becker & Shur

[57] ABSTRACT

The invention relates to a locking mechanism for use with two members which are mutually rotatable about a common pivot. The two members are a platform body (4) and a leg (1) therefor which is adjustable so as to vary the height of the platform body. The locking mechanism comprises a flat surface (6) on one of the members tangential to an opposing convex cylindrical surface on the other member, the cylindrical surface being coaxial with the pivot (2). The two surfaces define therebetween a substantially V-shaped gap which accommodates a cylindrical roller (7) in tangential frictional contact with the opposing surfaces. The roller is biased by releasable biasing means (9) towards the apex of the V-shaped gap, thereby to prevent rotation of the members in a direction which tends to urge the roller towards the apex, except on release of the biasing means, and freely to permit rotation in the opposite direction.

1 Claim, 2 Drawing Figures

LOCKING MECHANISM

This invention relates to a locking mechanism for use with two members which are mutually rotatable about a common pivot. The invention is generally applicable to the platform bodies having adjustable legs for varying the height thereof. It is particularly, but not exclusively, suitable for locking the adjustable legs of a tripod.

The invention provides a locking mechanism for use with two members which are mutually rotatable about a common pivot, the two members being a platform body and a leg therefor which is adjustable so as to vary the height of the platform body, the locking mechanism comprising a flat surface on one of the members tangential to an opposing convex cylindrical surface on the other member, the cylindrical surface being coaxial with the pivot, and the two surfaces defining therebetween a substantially V-shaped gap which accommodates a cylindrical roller in tangential frictional contact with the opposing surfaces, the roller being biased by releasable biasing means towards the apex of the V-shapd gap, thereby to prevent rotation of the members in a direction which tends to urge the roller towards the apex, except on release of the biasing means, and freely to permit rotation in the opposite direction.

Figure 1:
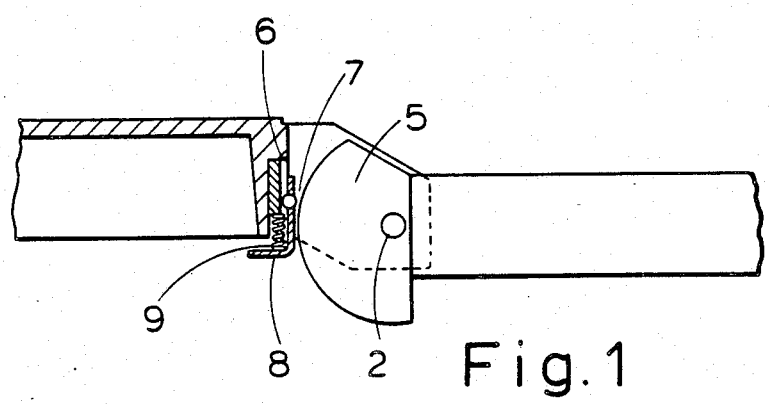

Reference is now made to the accompanying drawings, in which:

FIG. 1 is a side view, partly in section, of the head and one leg of a tripod provided with a leg locking mechanism according to a preferred embodiment of the invention; and, FIG. 2 is a top view corresponding to FIG. 1.

As shown in the drawings, the leg 1 of the tripod is secured by a captive pivot 2 within two lugs 3 projecting from the outside of a platform body known as the tripod head 4. The end 5 of the tripold leg 1 is machined to form a cylindrical surface concentric with the leg pivot 2. The cylindrical surface is tangential with an opposing flat surface 6 on the side of the tripod head 4, so that the two opposing surfaces define therebetween a substantially V-shaped gap. A hard cylindrical roller 7 is accomodated within this gap and captivated by a floating cage 8. The roller is positioned between the machined end 5 of the tripold leg and the opposing flat surface 6 between the leg pivot lugs, and is in tangential frictional contact with the opposing surfaces. The roller 7 is biased downwards, towards the apex of the V-shaped gap, between the converging surfaces by a helical spring 9, which is housed in the tripod head 4 and acts on the floating cage 8. The spring 9 thus maintains a nominal friction between the mating surfaces of the roller 7 and the cylindrical surface and flat surface 6.

The roller 7 can be lifted from this position by the floating cage 8 to eliminate this nominal friction by the application of an external force to the cage, e.g. finger pressure.

Rotation of the tripod leg about its pivot 2 in an upward direction, i.e. raising the leg, causes the roller 7 to be urged under the influence of the initial nominal friction down between the converging surfaces of the machined end 5 of the tripod leg and the opposing flat surface 6. The roller is unable to travel down between these converging surfaces because its attempt to force apart these surfaces is resisted by the rigid mounting of the pivot with respect to the flat surface 6. Friction between the roller 7 and the mating surfaces of end 5 and 6 increases proportionately with the load. Rotation of the leg about the pivot in this upward direction is therefore effectively prevented. The leg can, however, be raised if the roller is first lifted from its normal biased position, e.g. by applying finger pressure to the cage 8, so that the initial friction is zero. The roller is not then urged into the converging gap, and the leg can be freely raised.

Rotation of the leg about the pivot in the opposite direction, i.e. lowering the leg, is not prevented because in this case the roller is being urged under the influence of the initial friction away from the converging gap. Friction on the roller is in this case reduced to zero, and rotation in this upward direction is freely permitted.

The mechanism thus described facilitates infinite height and levelling adjustment within a finite range of the tripod head with respect to any ground plane. Any angular position of the leg with respect to the tripod head is allowed, within limits determined by over-travel stops only.

I claim:

1. A locking mechanism for use with a pair of members which are mutually rotatable about a common pivot, said members being a platfom body and a leg therefor which is adjustable so as to vary the height of the platform body, the locking mechanism comprising a substantially flat surface on one of the members tangential to an opposing convex cylindrical surface on the other member, the cylindrical surface being coaxial with the pivot, said cylindrical surface and said substantially flat surface defining therebetween a gap, and further including a cylindrical roller mounted within said gap in tangential frictional contact with the opposing surfaces, and means for releasably biasing the roller towards an apex of the gap to thereby prevent rotation of the members in a direction which tends to urge the roller towards the apex, except on release of the biasing means, and to freely permit rotation in the opposite direction.

* * * * *